(12) United States Patent
Koyama et al.

(10) Patent No.: US 9,411,285 B2
(45) Date of Patent: Aug. 9, 2016

(54) DRIVE TRANSMISSION DEVICE AND IMAGE FORMING APPARATUS

(71) Applicant: CANON KABUSHIKI KAISHA, Tokyo (JP)

(72) Inventors: Tomooku Koyama, Suntou-gun (JP); Jun Agata, Suntou-gun (JP); Wataru Uchida, Yokohama (JP); Naoyuki Maeda, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/594,610

(22) Filed: Jan. 12, 2015

(65) Prior Publication Data
US 2015/0198921 A1 Jul. 16, 2015

(30) Foreign Application Priority Data
Jan. 14, 2014 (JP) .................................. 2014-004071

(51) Int. Cl.
G03G 15/20 (2006.01)
F16H 57/04 (2010.01)

(52) U.S. Cl.
CPC ........ *G03G 15/2089* (2013.01); *F16H 57/0471* (2013.01); *F16H 57/0464* (2013.01); *Y10T 74/19991* (2015.01)

(58) Field of Classification Search
CPC .......................... G03G 15/757; F16H 57/0464
See application file for complete search history.

(56) References Cited

U.S. PATENT DOCUMENTS

| 8,548,357 B2 | 10/2013 | Fukushima |
| 2011/0158711 A1* | 6/2011 | Fukushima ................... 399/297 |
| 2011/0206438 A1* | 8/2011 | Igarashi et al. ............... 400/578 |

FOREIGN PATENT DOCUMENTS

| JP | 2000-205378 A | 7/2000 |
| JP | 2004-270847 A | 9/2001 |
| JP | 2010-85611 A | 4/2010 |
| JP | 2011-137478 A | 7/2011 |
| JP | 2011-174577 A | 9/2011 |
| JP | 2012-163192 A | 8/2012 |

OTHER PUBLICATIONS

Machine translation of JP-2012-163192.*

* cited by examiner

*Primary Examiner* — G. M. Hyder
(74) *Attorney, Agent, or Firm* — Fitzpatrick, Cella, Harper & Scinto

(57) ABSTRACT

A drive transmission device includes: a gear, provided with a shaft hole, for transmitting a driving force; a frame to which a fixing shaft for rotatably supporting the gear by engaging with the shaft hole is fixed, wherein during transmission of the driving force, the gear is urged in a radial direction of the shaft hole, and a predetermined region of an outer peripheral surface of the fixing shaft slides on an inner peripheral surface of the shaft hole; and a holding portion, provided in a position closer to a center of the fixing shaft than the predetermined region with respect to a radial direction of the fixing shaft, for holding a lubricant between itself and the shaft hole. The holding portion is disposed only in a position opposite the predetermined region with respect to the center of the fixing shaft.

16 Claims, 8 Drawing Sheets

(a)

(b)

G-G

DRIVE TRANSMISSION DEVICE AND IMAGE FORMING APPARATUS

FIELD OF THE INVENTION AND RELATED ART

The present invention relates to a drive transmission device and an image forming apparatus.

In an image forming apparatus, power generated from a power source such as a motor by various driving trains is transmitted to operate parts (components) for respective portions. As the driving train, a gear train is used in general in many cases. The gear train is constituted by members such as a frame, a plurality of shafts provided substantially perpendicular to the frame, and a plurality of gears rotating by engaging with the shafts. Examples of the gears may include an input gear for inputting a driving force into the gear train, a follower gear for transmitting the driving force from the input gear, and an output gear for receiving the driving force from the follower gear to operate the parts for the respective portions. During the drive of the gear train, the follower gear receives an urging force in a specific radial direction depending on a positional relationship with an adjacent output gear, a rotational direction or the like. At this time, in the case where a load torque of the output gear is large, the follower gear is rotated by receiving a large urging force. As a result, there was a liability that a follower gear rotation center hole and a shaft slide with each other at high pressure to cause abrasion of the follower gear rotation center hole.

In the image forming apparatus, e.g., a gear connected with a pressing roller corresponds to the output gear. The follower gear adjacent to the gear requires a large torque for rotation, and therefore a gear tooth surface is required to have high durability against abrasion. Further, the follower gear is close to a heat source and therefore is required to have a heat-resistant property. Further, the follower gear is rotated by receiving the large urging force, and therefore is also required to have a good sliding property (lubricating property) between the follower gear rotation center hole and the shaft. A material simultaneously satisfying such conditions is very expensive, and therefore a device such that the sliding property is enhanced by applying a lubricant such as grease is needed.

A constitution in which the lubricant such as the grease is applied to the sliding portion between the follower gear rotation center hole and the shaft in order to improve the sliding property is described in Japanese Laid-Open Patent Application (JP-A) 2011-137478 and JP-A 2011-174577. In JP-A 2011-137478, a shaft is provided with a groove extending through one-full circumference along a circumferential direction, and grease is filled in the groove to prevent abrasion of the rotation center hole by being held in the groove. In JP-A 2011-174577, a sliding portion between the rotation center hole and the shaft is provided with a groove for holding the grease, so that the grease is held to prevent abrasion of the rotation center hole.

However, in either of the constitutions of JP-A 2011-137478 and JP-A 2011-174577, although the grease exists, the follower gear rotation center hole and an end portion of the groove may be provided on the shaft slide with each other. For that reason, in the case where drive is made for a long time with a high urging force, there is a liability that the follower gear rotation center hole is abraded (worn) at the groove end portion.

SUMMARY OF THE INVENTION

A principal object of the present invention is to provide a drive transmission device and an image forming apparatus which have solved the above-described problem.

According to an aspect of the present invention, there is provided a drive transmission device comprising: a gear, provided with a shaft hole, for transmitting a driving force; a frame to which a fixing shaft for rotatably supporting the gear by engaging with the shaft hole is fixed, wherein during transmission of the driving force, the gear is urged in a radial direction of the shaft hole, and a predetermined region of an outer peripheral surface of the fixing shaft slides on an inner peripheral surface of the shaft hole; and a holding portion, provided in a position closer to a center of the fixing shaft than the predetermined region with respect to a radial direction of the fixing shaft, for holding a lubricant between itself and the shaft hole, wherein the holding portion is disposed only in a position opposite the predetermined region with respect to the center of the fixing shaft.

According to an aspect of the present invention, there is provided a drive transmission device comprising: a gear, provided with a rotation shaft, for transmitting a driving force; a frame, provided with a shaft hole with which the rotation shaft engages, for rotatably supporting the rotation shaft of the gear, wherein during transmission of the driving force, the gear is urged in a radial direction of the rotation shaft, and a predetermined region of an inner peripheral surface of the shaft hole slides on an outer peripheral surface of the rotation shaft; and a holding portion for holding a lubricant between itself and the rotation shaft, wherein the holding portion is disposed only in a position opposite the predetermined region with respect to the center of the shaft hole.

According to another aspect of the present invention, there is provided an image forming apparatus comprising: a pressing member for fixing a toner image on a recording material by applying pressure to the recording material with respect to a thrust direction; a gear, provided with a shaft hole, for transmitting a driving force to the pressing member; a frame to which a fixing shaft for rotatably supporting the gear by engaging with the shaft hole is fixed, wherein during transmission of the driving force, the gear is urged in a radial direction of the shaft hole, and a predetermined region of an outer peripheral surface of the fixing shaft slides on an inner peripheral surface of the shaft hole; and a holding portion, provided in a position closer to a center of the fixing shaft than the predetermined region with respect to a radial direction of the fixing shaft, for holding a lubricant between itself and the shaft hole, wherein the holding portion is disposed only in a position opposite the predetermined region with respect to the center of the fixing shaft.

According to a further aspect of the present invention, there is provided an image forming apparatus comprising: a pressing member for fixing a toner image on a recording material by applying pressure to the recording material with respect to a thrust direction; a gear, provided with a rotation shaft, for transmitting a driving force to the pressing member; a frame, provided with a shaft hole with which the rotation shaft engages, for rotatably supporting the rotation shaft of the gear, wherein during transmission of the driving force, the gear is urged in a radial direction of the rotation shaft, and a predetermined region of an inner peripheral surface of the shaft hole slides on an outer peripheral surface of the rotation shaft; and a holding portion for holding a lubricant between itself and the rotation shaft, wherein the holding portion is disposed only in a position opposite the predetermined region with respect to the center of the shaft hole.

These and other objects, features and advantages of the present invention will become more apparent upon a consideration of the following description of the preferred embodiments of the present invention taken in conjunction with the accompanying drawings.

DESCRIPTION OF THE EMBODIMENTS

Hereinbelow, embodiments of the present invention will be specifically described with reference to the drawings.

In the following, an image forming apparatus according to the present invention will be further specifically described in conformity with the drawings. However, dimensions, materials and shapes of constituent elements and their relative arrangements and the like described in the following embodiments should be changed appropriately depending on structures and various conditions of accommodates (devices) to which the present invention is applied, and the scope of the present invention is not intended to be limited to the following embodiments.

[Embodiment 1]

Embodiment 1 will be described.

Figure 1:
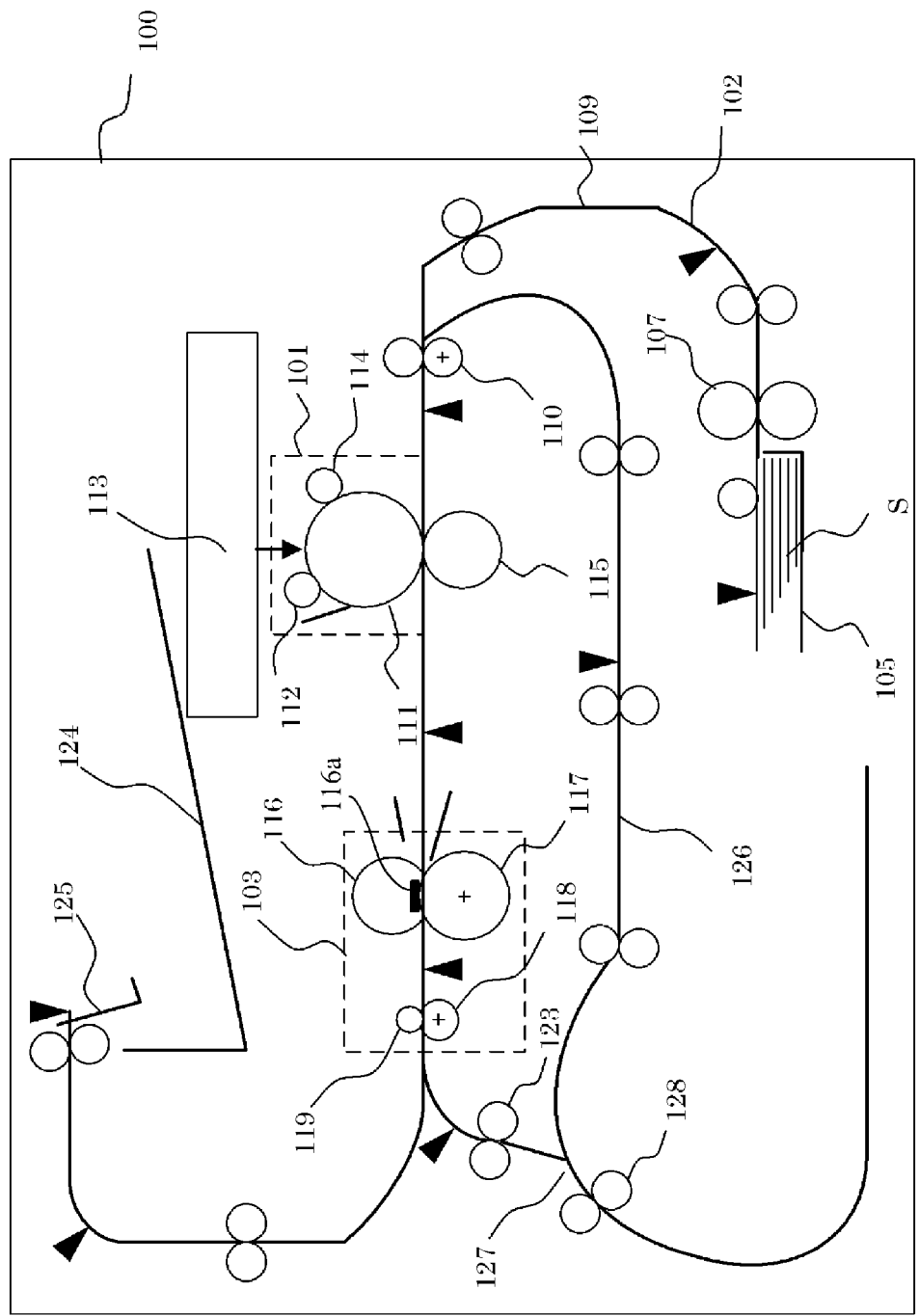
FIG. 1 is a sectional view showing a schematic structure of an image forming apparatus.

FIG. 1 is a sectional showing a monochromatic digital printer which is an example of an image forming apparatus in this embodiment.

In FIG. 1, in an image forming apparatus main assembly 100, an image forming portion 101 is accommodated. The image forming apparatus includes a recording material feeding portion 102 for feeding a recording material S to the image forming portion 101 and a fixing device 103 for fixing an image on the recording material S. A stacking portion 124 is located at an upper surface of the apparatus main assembly 100 for stacking the recording material S on which the image is formed by the image forming portion 101.

The image forming portion 101 includes a photosensitive drum 111 rotating in the clockwise direction in FIG. 1, an exposure device 113, and members, provided along a rotational direction of the photosensitive drum 111, consisting of a charging roller 112, a driving device 114 and a transfer roller 115. The image forming portion 101 forms a toner image on the recording material S by an image forming process.

The recording material feeding portion 102 includes a feeding cassette 105 in which a plurality of sheets of the recording material S are accommodated in a stacked state, a feeding roller 107, a feeding guide 109, a registration roller pair 110 and the like.

The fixing device 103 includes a fixing belt 116, a pressing roller 117 contacted to the fixing belt 116 from below the fixing belt 116, a fixing-discharging roller 118, a fixing-discharging opposite roller 119 contacted to the fixing-discharging roller 118 from above the fixing-discharging roller 118, and a heater 116a contacting an inner peripheral surface of the fixing belt 116. The pressing roller 117 is pressed toward the fixing belt 116 to nip the fixing belt 116 between itself and the heater 116a. The pressing roller 117 is driven by a motor described later, thus rotating the fixing belt 116 to which the pressing roller 117 is contacted. When the recording material S passes through a fixing nip formed between the pressing roller 117 and the fixing belt 116, heat and pressure are applied to the recording material S, so that the toner image is fixed on the recording material S.

Among the image forming portion 101, the fixing device 103 and the feeding cassette 105, a feeding path 126, for re-feeding of the recording material S, used when the image is formed on both of the front and back surfaces of the recording material S is provided.

In the case where the image is formed on both surfaces of the recording material S, the recording material S carrying the toner image fixed on one surface (front surface) is fed toward a receiving roller pair 123. Then, a trailing end of the recording material passes through a branched portion 127, and thereafter a reversing roller pair 128 is reversed in direction of rotation, whereby the recording material S is switched back to pass through the feeding path 126 and then is fed to the image forming portion 101 again.

A full stacking state detecting lever 125 is provided for detecting a full stacking state of the recording material S stacked at the stacking portion 124. When the full stacking state of the recording material S is detected by the full stacking state detecting lever 125, an unshown controller constitutes the image forming portion so that the image is not formed on the recording material S until the recording material S on the stacking portion 124 is removed.

Members, such as the registration roller pair 110, the transfer roller 115, and the pressing roller 117, are driven during the image formation by transmitting a driving force that is generated from a motor (driving source) to the respective members (portions) by a gear train (drive transmission device, drive transmission mechanism), as described later.

Figure 2:
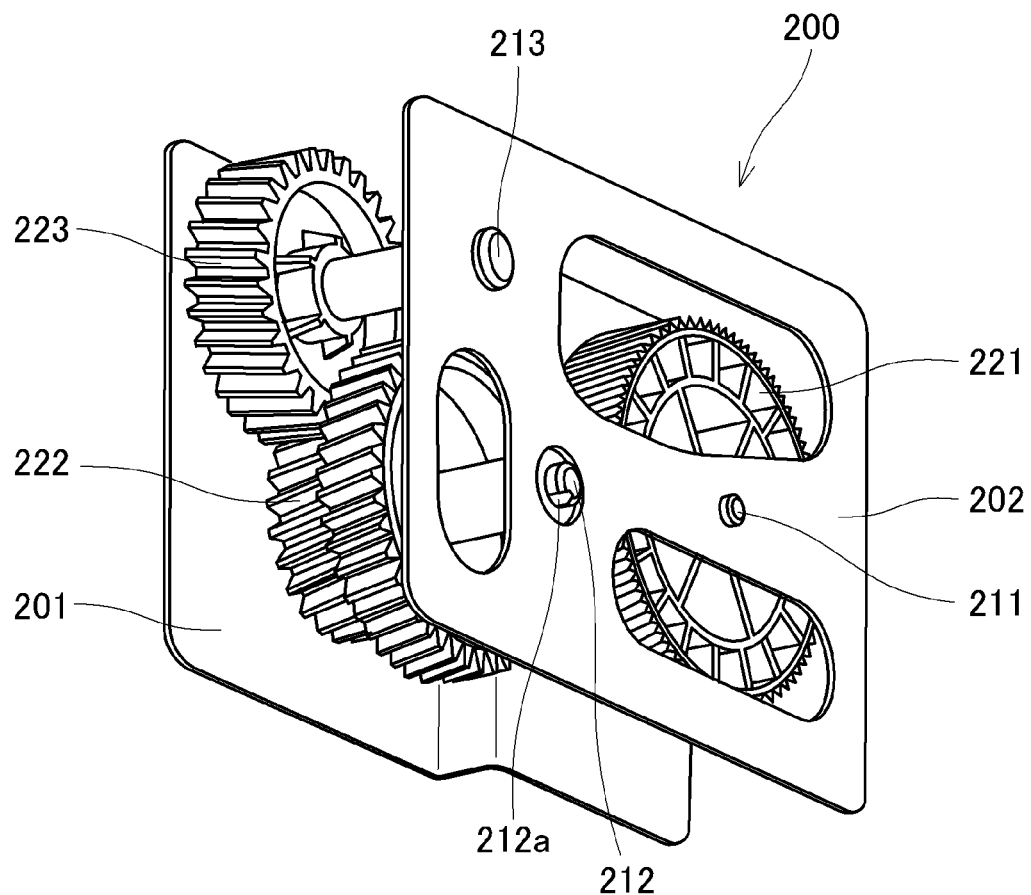
FIG. 2 is a schematic perspective view for illustrating a structure of a gear train.
Figure 3:
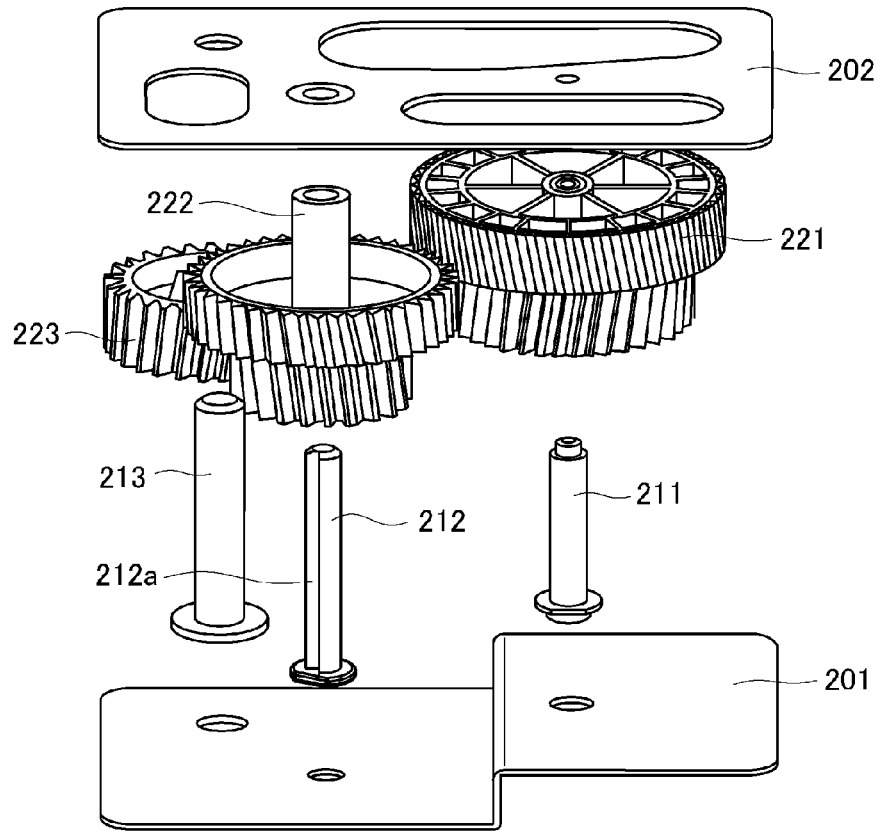
FIG. 3 is a schematic exploded perspective view for illustrating the structure of the gear train.
Figure 4:
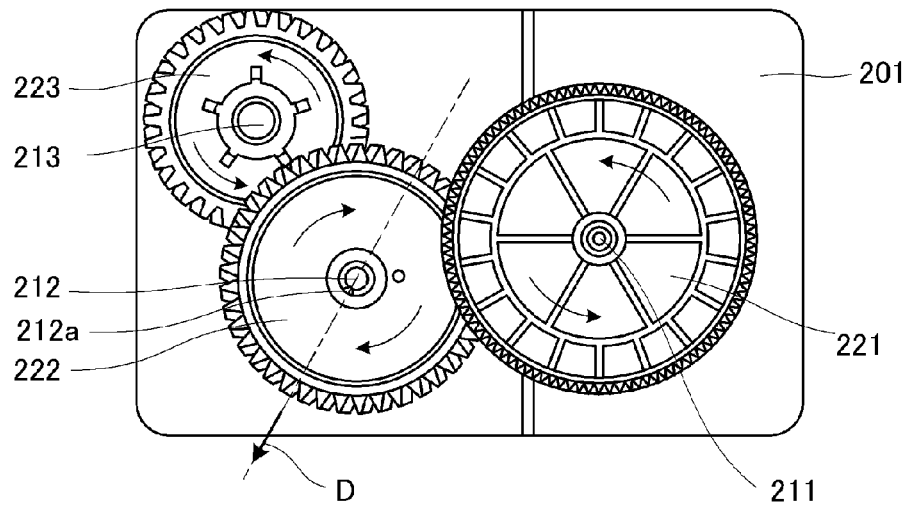
FIG. 4 is a schematic front view showing a state of the gear train from which a frame B is removed.

FIGS. 2 and 3 are schematic perspective views for illustrating a structure of a gear train 200 as the drive transmission device in this embodiment. FIG. 4 is a schematic front view showing a state of the gear train 200 from which a frame B 202 is removed.

The gear train 200 includes two frames consisting of a frame A 201 and the frame B 202 which hold shafts and gears as described below. The shafts include a shaft A 211, a shaft B 212 and a shaft C 213, and each of the shaft feet is caulked on the frame A 201 and is perpendicular to the frame A 201. The shaft B 212 corresponds to a fixing shaft. Each of the shaft end portions of the shaft A 211, the shaft B 212 and the shaft C 213 roughly engage with the frame B 202. An input gear 221, a follower gear 222 and an output gear 223 engage with the shaft A 211, the shaft B 212 and the shaft C 213, respectively, in a manner such that the shafts are loosely fitted in associated rotation center holes (shaft holes), with the result that the gears are rotatably supported (held) by the shafts.

In the gear train 200 in this embodiment, the driving force from the motor is transmitted from the input gear 221 and then is transmitted to the output gear 223 via the follower gear 222. During an assembling of the gear train 200, the gears are assembled in a state in which grease is applied onto shaft surfaces, so that the grease is in a state in which the grease is disposed between the shaft surface and the rotation center hole.

In the apparatus main assembly 100, the gear connected with the pressing roller (pressing member) 117 which is a driven member requires a large torque for being rotated. In this embodiment, the case where the gear 223 is connected with the pressing roller 117 will be described.

As shown in FIG. 4, the driving force from the motor is transmitted by rotating the input gear 221, the follower gear 222 and the output gear 223 in arrow directions in the figure. During the transmission of the driving force in such a manner, the follower gear 222 receives an urging force, in a specific radial direction (arrow D direction in this embodiment), which is a resultant force of forces exerted from the gears (the input gear 221 and the output gear 223) on the follower gear 222. This direction of the urging force is determined from the relationship of engaging positions of the follower gear 222 with the input gear 221 and the output gear 223, drive transmission directions (rotational directions) in the engaging positions, and the like.

Figure 5:
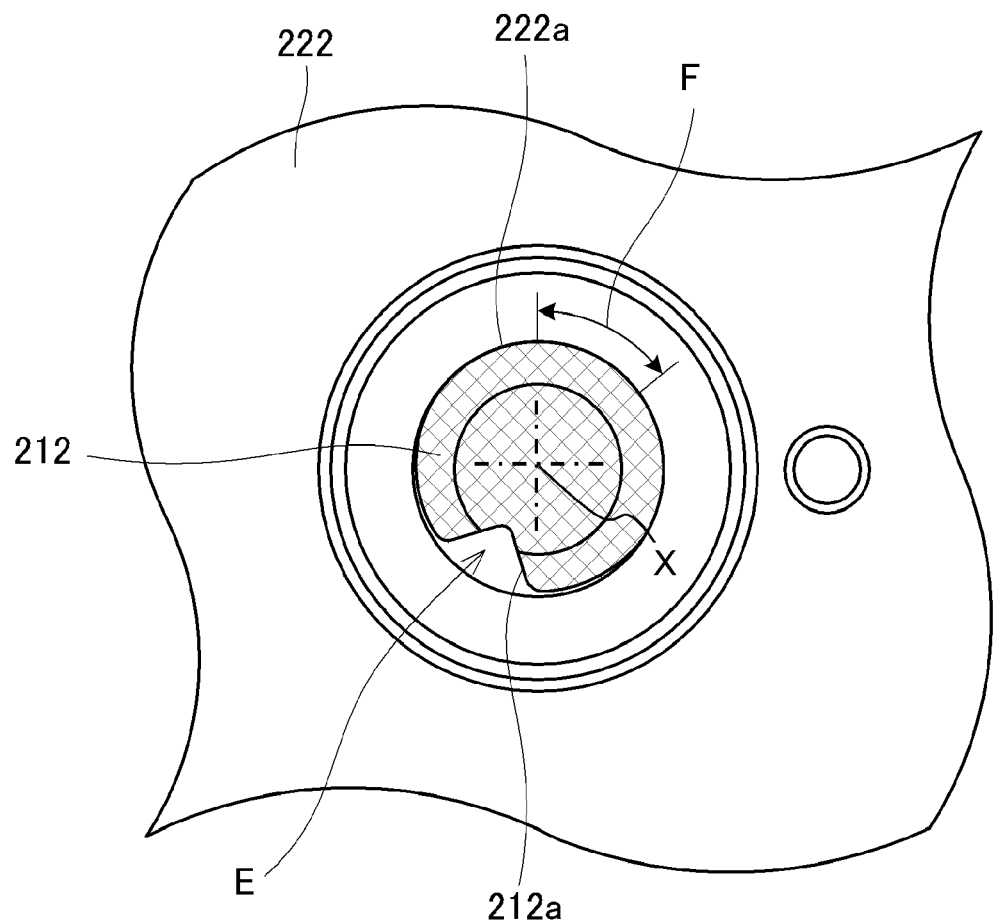
FIG. 5 is an enlarged view showing an engaging portion between a follower gear and a shaft B in a state in which the follower gear receives an urging force.

FIG. 5 is an enlarged view of an engaging portion between the follower gear 222 and the shaft B 212 in a state in which the follower gear 222 receives the urging force. The follower gear 222 engages with the shaft B 212 in a loose fitting manner, so that an inner diameter of an inner peripheral surface of the follower gear 222 is somewhat larger than an outer diameter of an outer peripheral surface of the shaft B 212. Accordingly, during the drive (driving force) transmission, the follower gear 222 receives the urging force in the arrow D direction shown in FIG. 4, and thus is shifted in the arrow D direction correspondingly to engage play with the shaft B 212. For this reason, the inner peripheral surface of a rotation center hole 222a of the follower gear 222 and a predetermined region as a part of the outer peripheral surface of the shaft B 212 slide with each other. A portion F (shown in FIG. 5) is the predetermined region as the part of the outer peripheral surface of the shaft B 212 and will be described below as a sliding portion F.

On the other hand, a spacing (gap) is formed between the rotation center hole 222a of the follower gear 222 and the shaft B 212 in a side opposite from the sliding portion F as shown in FIG. 5. In this embodiment, of the outer peripheral surface of the shaft B 212, a groove-shaped holding surface 212a as a holding portion is provided at the portion where the spacing is formed, and a grease holding portion E for holding a lubricant such as grease is formed between the holding surface 212a and the inner peripheral surface of the rotation center hole 222a. With respect to the radial direction, the holding surface 212a is disposed at a position closer to a center X of the shaft B 212 than the sliding portion F of the shaft B 212. The holding surface 212a is provided only in a position, of the outer peripheral surface of the shaft B 212, opposite the sliding portion F with respect to the center X of the shaft B 212. By employing such a constitution, it is possible to prevent sliding between the rotation center hole 222a of the follower gear 222 and the holding surface 212a provided on the shaft B 212. Further, the grease accumulated in the grease holding portion E is fed (supplied) to the sliding portion F with rotation of the follower gear 222, and therefore the grease can be disposed at the sliding portion F.

As described above, in this embodiment, of the outer peripheral surface of the shaft B 212, the holding surface 212a is provided only in the position, other than the position of the sliding portion F where the shaft B 212 slides with the inner peripheral surface of the rotation center hole 222a of the follower gear 222, opposite the sliding portion F with respect to the center X of the shaft B 212. As a result, the rotation center hole 222a of the follower gear 222 and the holding surface 212a of the shaft B 212 are prevented from sliding with each other and contacting each other. Further, the grease accumulated in the grease holding portion E is supplied to the sliding portion F with rotation of the follower gear 222, so that the sliding property (sliding performance, lubricating property) of the sliding portion F can be kept in a good state. Accordingly, abrasion due to the sliding between the rotation center hole 222a of the follower gear 222 and the shaft B 212 can be prevented while holding the sliding property of the sliding portion F, so that it is possible to provide the gear train 200 having a high durability and to provide the image forming apparatus including the gear train 200.

In this embodiment, the holding surface 212a is provided at a portion (in a side opposite from the sliding portion F), of the shaft B 212, where the spacing is formed between the rotation center hole 222a of the follower gear 222 and the shaft B 212 by receiving the urging force in the arrow D direction, but the present invention is not limited thereto. That is, the holding surface 212a may only be required to be provided in a region, other than the region where the shaft B 212 slides with the rotation center hole 222a of the follower gear 222, by receiving the urging force in the arrow D direction. Further, with respect to the shaft B 212 in this embodiment, the holding portion is constituted by the holding surface 212a having a cross-sectional shape shown in FIG. 5 and extending in a thrust direction (axial direction), but the present invention is not limited thereto. The holding portion provided on the shaft B 212 may only be required to hold the lubricant between the shaft B 212 and the rotation center hole 222a of the follower gear 222, and may also be, e.g., one or more recessed portion (recess) provided on the outer peripheral surface of the shaft B 212. The holding portion may only be required that the sliding property between the rotation center hole 222a of the follower gear 222 and the shaft hole B 212 is improved by the lubricant held in the recessed portion, and therefore a shape and the number of the recessed portion are not particularly limited.

Figure 10:
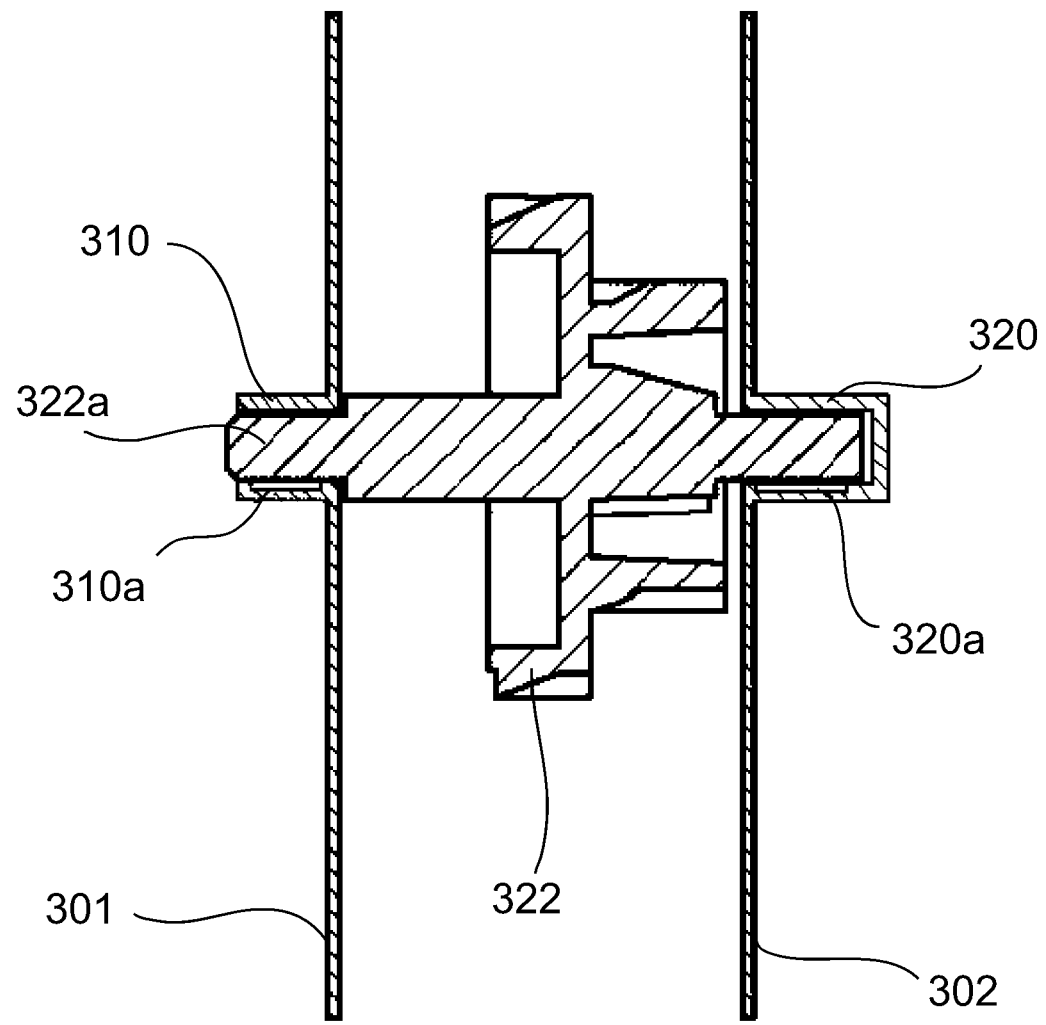
FIG. 10 is a schematic sectional view of a gear holding portion.

In this embodiment, a constitution in which the shaft B 212 rotatably supporting the follower gear 222 is provided with the holding surface 212a was described, but the present invention is not limited thereto. The present invention can be suitably applied if the gear is urged in the radial direction during the transmission of the driving force from the motor, so that the above-described effect can be obtained. In this embodiment, a constitution in which the shaft B 212 is provided between the frame A 201 and the frame B 202 and in which the rotation center hole 222a rotatably engaging with the shaft B 212 is provided in the follower gear 222 was described, but the present invention is not limited thereto. That is, as shown in a schematic sectional view of the gear holding portion of FIG. 10, a constitution in which a follower gear 322 is provided with a rotation shaft 322a and shaft holes 310 and 320 with which the rotation shaft 322a of the follower gear 322 rotatably engages are provided in frames 301 and 302 may also be employed. In this constitution, during the transmission of the driving force, the follower gear 322 is urged in the radial direction of the rotation shaft 322a, so that a predetermined region of an inner peripheral surface of each of the shaft holes 310 and 320 and an associated pressing of the rotation shaft 322a slide with each other. Further, each of holding portions 310a and 320a is provided only in a position, of the associated inner peripheral surface of the shaft hole 310 or 320 provided in the frame 301 or 302, opposite the associated predetermined region with respect to the associated center of the shaft hole 310 or 320. Further, in this embodiment, a constitution in which the gear train 200 as the drive transmission device includes a single follower gear 222 was described, but the present invention is not limited thereto.

That is, the gear train 200 may also be provided with a plurality of follower gears. Further, the drive transmission device may also be constituted by a single drive transmission gear.

[Embodiment 2]

Embodiment 2 will be described.

Figure 6:
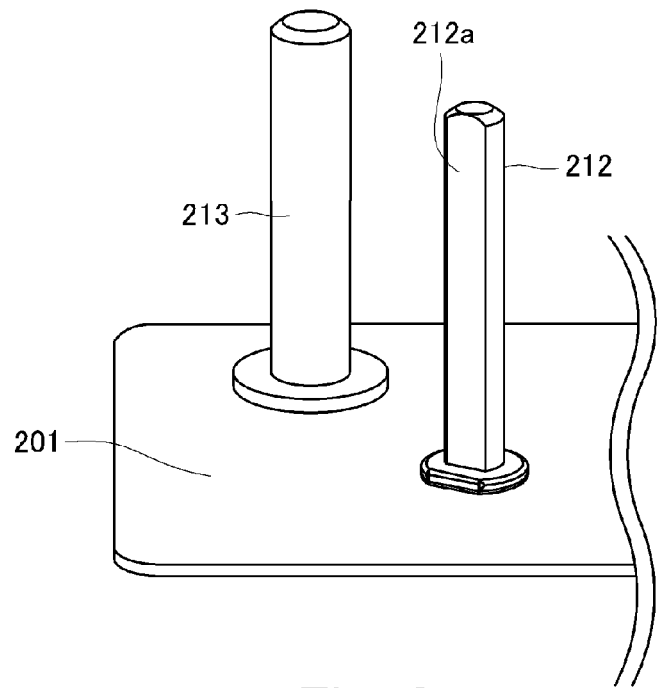
FIG. 6 is a schematic view for illustrating a shape of a shaft B.

FIG. 6 is a schematic view for illustrating a shape of a shaft B 212 in this embodiment. In this embodiment, a shape of the shaft B 212 is different from that in Embodiment 1. In this embodiment, a constitution portion different from that in Embodiment 1 will be described, and the same constitution portion as that in Embodiment 1 will be omitted from description.

In Embodiment 1, the holding surface 212a having the substantially V-shape in cross-section was provided on the shaft B 212 as shown in FIG. 5, but in this embodiment, a holding surface 212a having a substantially D-shape in cross-section when the shaft B 212 is cut along the radial direction is provided. In other words, the cross-sectional shape of the holding surface 212a can be said such that the shape (substantially D-shape) is constituted by dividing a circle into two shapes by a half line and then by remaining one of the divided two shapes.

By employing such a constitution, compared with Embodiment 1, it is possible to easily perform processing of the holding surface 212a of the shaft B 212 and application of the grease onto the holding surface 212a. As a result, it becomes possible to inexpensively prevent the abrasion due to sliding between the rotation center hole 222a of the follower gear 222 and the shaft B 212.

[Embodiment 3]

Embodiment 3 will be described.

Figure 7:
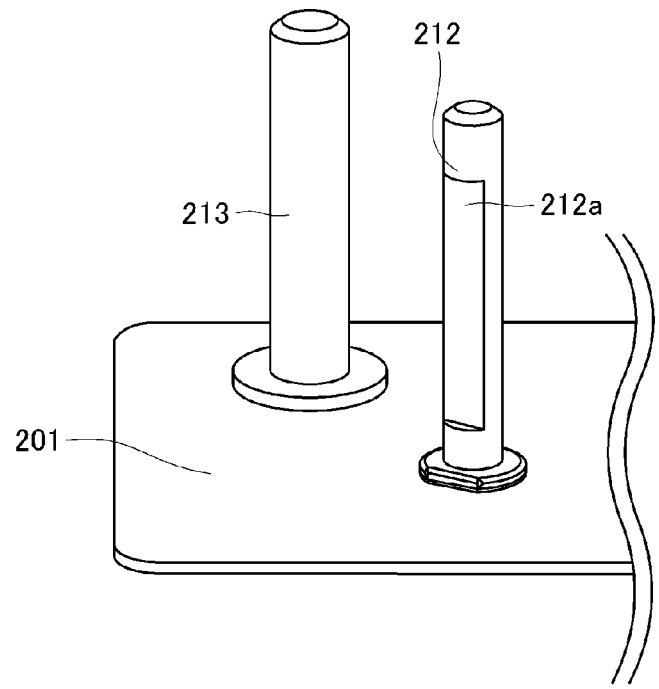
FIG. 7 is a schematic view for illustrating a shape of another shaft B.
Figure 8:
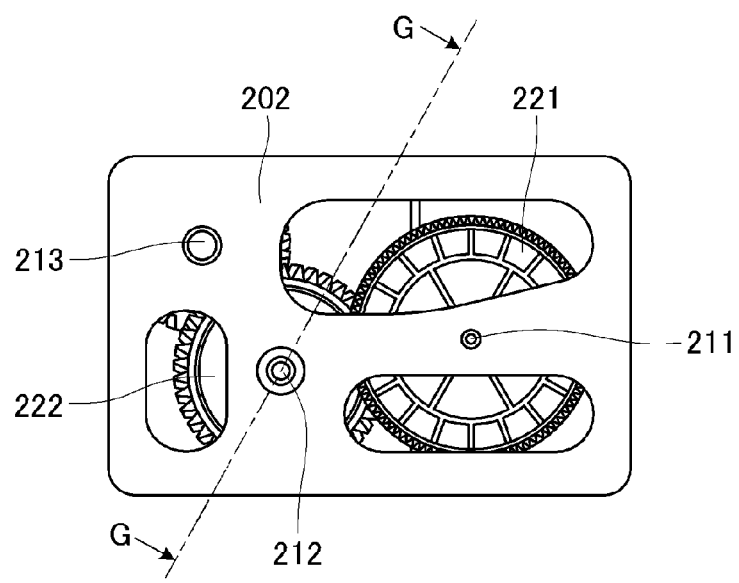
In FIG. 8, (a) and (b) are schematic views showing a gear train.
Figure 8:
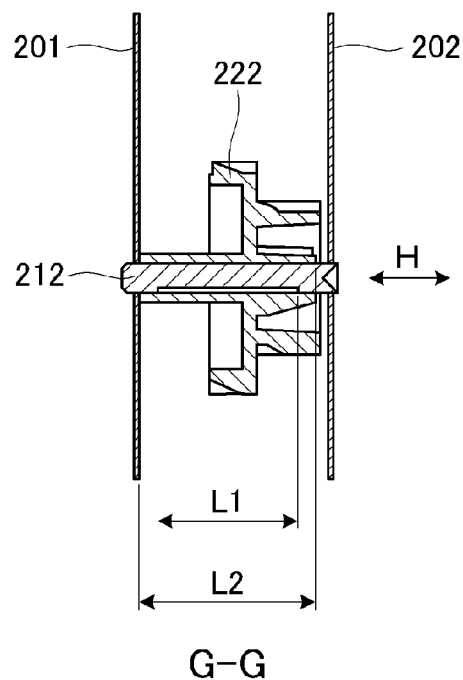

FIG. 7 is a schematic view for illustrating a shape of a shaft B 212 in this embodiment. In FIG. 8, (a) is a schematic front view showing a gear train 200 in this embodiment, and (b) is a schematic sectional view, taken along a line G-G in (a) of FIG. 8, having a plane, as a cutting plane, including a center shaft (center axis) of the shaft B 212 and a rotation center axis of the follower gear 222 in this embodiment. In this embodiment, a range in which the holding surface 212a of the shaft B 212 is provided with respect to the thrust direction is different from that in Embodiments 1 and 2. In this embodiment, a constitution portion different from that in Embodiments 1 and 2 will be described, and the same constitution portion as that in Embodiments 1 and 2 will be omitted from description.

In Embodiments 1 and 2, the holding surface 212a of the shaft B 212 was provided over an entire region with respect to the thrust direction. In such a case, there is a liability that the grease held by the grease holding portion E flows from the grease holding portion E to an outside.

Therefore, in this embodiment, the holding portion 212a of the shaft B 212 is provided only in a predetermined region with respect to the thrust direction. That is, the holding surface 212a of the shaft B 212 is positioned in an engaging region in which the rotation center hole 222a of the follower gear 222 and the shaft B 212 engage with each other with respect to the thrust direction. This will be specifically described with reference to (b) of FIG. 8. When a length of the holding surface 212a of the shaft B 212 with respect to the thrust direction is L1 and an engaging length with respect to the thrust direction, in the region in which the shaft B 212 and the follower gear 222 engage with each other is L2, L1 <L2 is satisfied.

By employing such a constitution, compared with Embodiment 1, it is possible to prevent flowing-out of the grease from the holding surface 212a to the outside. Therefore, it becomes possible to prevent the abrasion due to sliding between the rotation center hole 222a of the follower gear 222 and the shaft B 212 with reliability.

[Embodiment 4]

Embodiment 4 will be described.

Figure 9:
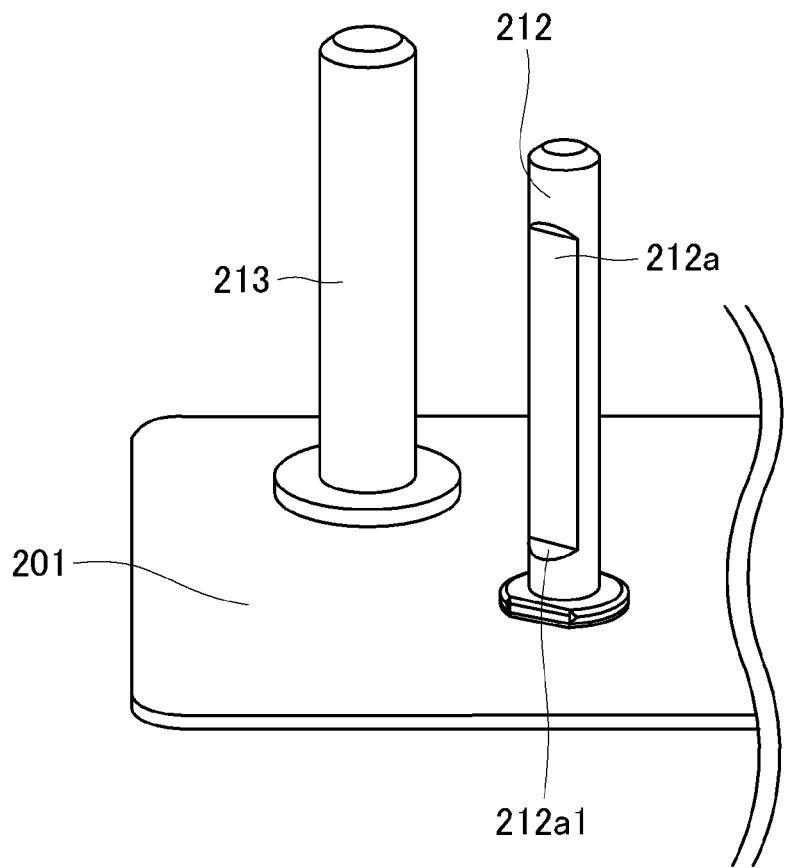
FIG. 9 is a schematic view for illustrating a shape of another shaft B.

FIG. 9 is a schematic view for illustrating a shape of a shaft B 212 in this embodiment. In this embodiment, a shape of an end portion of the holding surface 212a of the shaft B 212 with respect to the thrust direction is different from that in Embodiment 3. In this embodiment, a constitution portion different from that in Embodiment 3 will be described, and the same constitution portion as that in Embodiment 3 will be omitted from the following description.

In Embodiment 3, the end portion of the holding surface 212a of the shaft B 212 with respect to the thrust direction was constituted by a plane substantially perpendicular to the thrust direction (i.e., a plane substantially perpendicular to the outer peripheral surface of the shaft B 212). In such a case, during the assembling of the gear train or the like, when the follower gear 222 is moved in the thrust direction, there is a liability that the rotation center hole 222a thereof is abraded by the thrust direction end portion of the holding surface 212a of the shaft B 212.

Therefore, in this embodiment, the thrust direction end portion of the holding surface 212a of the shaft B 212 has an inclined shape as shown in FIG. 9. That is, a thrust direction end portion 212a1 of the holding surface 212a in this embodiment is formed in the inclined shape such that a depth of the holding surface 212a decreases toward an edge (boundary portion with the outer peripheral surface of the shaft B 212).

By employing such a constitution, even in the case where the follower gear 222 is moved in the thrust direction (arrow H direction in (b) of FIG. 8) during the assembling or the like, the rotation center hole 222a thereof is prevented from being abraded by the thrust direction end portion of the holding surface 212a of the shaft B 212. As a result, it becomes possible to prevent the abrasion due to sliding between the rotation center hole 222a of the follower gear 222 and the shaft B 212 with reliability.

According to the present invention, in the drive transmission device in which the gears for transmitting the driving force are provided and are urged in the radial direction, it becomes possible to prevent generation of the abrasion due to the sliding between the shaft and the shaft hole while maintaining the sliding property between the shaft and the shaft hole.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 004071/2014 filed Jan. 14, 2014, which is hereby incorporated by reference.

What is claimed is:

1. A drive transmission device comprising:
a first gear, provided with a shaft hole, for transmitting a driving force;
a second gear engaging with the first gear;
a third gear engaging with the first gear;
a frame to which a fixing shaft for rotatably supporting the first gear by engaging with the shaft hole is fixed, wherein during transmission of the driving force, the first gear is urged in a predetermined direction, which is a radial direction of the shaft hole, by forces received from the second gear and the third gear, and at a predetermined region, an outer peripheral surface of the fixing shaft contacts an inner peripheral surface of the shaft hole; and a holding portion, provided in a position closer to a center of the fixing shaft than the predetermined region with respect to a radial direction of the fixing shaft, for holding a lubricant between the holding portion and the shaft hole, wherein, during the transmission of the driving force, the holding portion, the center of the shaft hole and the predetermined region are disposed along a straight line, and the holding portion is disposed only in a position opposite the predetermined region with respect to the center of the fixing shaft, and wherein each of the first gear, the second gear, and the third gear has a rotation axis, and the rotation axes of the first gear, the second gear, and the third gear are not disposed within a plane.

2. A drive transmission device according to claim 1, wherein the holding portion is a recessed portion provided on the outer peripheral surface of the fixing shaft.

3. A drive transmission device according to claim 2, wherein the recessed portion is a groove extending in a thrust direction.

4. A drive transmission device according to claim 3, wherein the fixing shaft has a substantially D-shape in cross section when the fixing shaft is cut in a radial direction at a portion of the groove.

5. A drive transmission device according to claim 3, wherein at an end portion of the groove with respect to the thrust direction, an inclined portion is provided so that a depth of the groove decreases toward an edge of the groove.

6. A drive transmission device according to claim 1, wherein the straight line extends in the predetermined direction.

7. A drive transmission device comprising:
a first gear, provided with a rotation shaft, for transmitting a driving force;
a second gear engaging with the first gear;
a third gear engaging with the first gear;
a frame, provided with a shaft hole with which the rotation shaft engages, for rotatably supporting the rotation shaft of the first gear; and
a holding portion for holding a lubricant between the holding portion and the rotation shaft,
wherein during transmission of the driving force, the first gear is urged in a predetermined direction, which is a radial direction of the shaft hole, by forces received from the second gear and the third gear, and at a predetermined region, an outer peripheral surface of the fixing shaft contacts an inner peripheral surface of the shaft hole;
wherein the holding portion, the center of the shaft hole and the predetermined region are disposed along a straight line, and the holding portion is disposed only in a position opposite the predetermined region with respect to the center of the shaft hole, and
wherein each of the first gear, the second gear, and the third gear has a rotation axis, and the rotation axes of the first gear, the second gear, and the third gear are not disposed within a plane.

8. A drive transmission device according to claim 7, wherein the straight line extends in the predetermined direction.

9. An image forming apparatus comprising:
a pressing member for fixing a toner image on a recording material by applying pressure to the recording material with respect to a thrust direction;
a first gear, provided with a shaft hole, for transmitting a driving force to the pressing member;
a second gear engaging with the first gear;
a third gear engaging with the first gear;
a frame to which a fixing shaft for rotatably supporting the first gear by engaging with the shaft hole is fixed, wherein during transmission of the driving force, the first gear is urged in a predetermined direction, which is a radial direction of the shaft hole, by forces received from the second gear and the third gear, and at a predetermined region, an outer peripheral surface of the fixing shaft contacts an inner peripheral surface of the shaft hole; and a holding portion, provided in a position closer to a center of the fixing shaft than the predetermined region with respect to a radial direction of the fixing shaft, for holding a lubricant between the holding portion and the shaft hole, wherein the holding portion, a center of the shaft hole and the predetermined region are disposed along a straight line, and the holding portion is disposed only in a position opposite the predetermined region with respect to the center of the fixing shaft, and wherein each of the first gear, the second gear, and the third gear has a rotation axis, and the rotation axes of the first gear, the second gear, and the third gear are not disposed within a plane.

10. An image forming apparatus device according to claim 9, wherein the holding portion is a recessed portion provided on the outer peripheral surface of the fixing shaft.

11. An image forming apparatus according to claim 10, wherein the recessed portion is a groove extending in a thrust direction.

12. An image forming apparatus according to claim 11, wherein the fixing shaft has a substantially D-shape in cross section when the fixing shaft is cut in a radial direction at a portion of the groove.

13. An image forming apparatus according to claim 11, wherein at an end portion of the groove with respect to the thrust direction, an inclined portion is provided so that a depth of the groove decreases toward an edge of the groove.

14. An image forming apparatus according to claim 9, wherein the straight line extends in the predetermined direction.

15. An image forming apparatus comprising:
a pressing member for fixing a toner image on a recording material by applying pressure to the recording material with respect to a thrust direction;
a first gear, provided with a rotation shaft, for transmitting a driving force to the pressing member;
a second gear engaging with the first gear;
a third gear engaging with the first gear;
a frame, provided with a shaft hole with which the rotation shaft engages, for rotatably supporting the rotation shaft of the first gear; and
a holding portion for holding a lubricant between the holding portion and the rotation shaft,
wherein during transmission of the driving force, the first gear is urged in a predetermined direction, which is a radial direction of the shaft hole, by forces received from the second gear and the third gear, and at a predetermined region, an outer peripheral surface of the fixing shaft contacts an inner peripheral surface of the shaft hole, wherein the holding portion, a center of the shaft hole and the predetermined region are disposed along a straight line, and the holding portion is disposed only in a position opposite the predetermined region with respect to the center of the shaft hole, and wherein each of the first gear, the second gear, and the third gear has a rotation axis, and the rotation axes of the first gear, the second gear, and the third gear are not disposed within a plane.

16. An image forming apparatus according to claim 15, wherein the straight line extends in the predetermined direction.

* * * * *